(12) United States Patent
Fujita et al.

(10) Patent No.: US 9,444,312 B2
(45) Date of Patent: Sep. 13, 2016

(54) ROTARY ELECTRIC MACHINE

(71) Applicant: Mitsubishi Electric Corporation, Chiyoda-ku, Tokyo (JP)

(72) Inventors: Masahiko Fujita, Chiyoda-ku (JP); Yoshinobu Utsumi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 267 days.

(21) Appl. No.: 14/314,564

(22) Filed: Jun. 25, 2014

(65) Prior Publication Data
US 2015/0188395 A1   Jul. 2, 2015

(30) Foreign Application Priority Data

Dec. 26, 2013  (JP) .................. 2013-269184

(51) Int. Cl.
*H02K 11/00*  (2016.01)
*H02K 11/04*  (2016.01)
*H02K 5/22*   (2006.01)

(52) U.S. Cl.
CPC ............. *H02K 11/048* (2013.01); *H02K 5/225* (2013.01)

(58) Field of Classification Search
CPC ... H02K 5/225; H02K 11/046; H02K 11/048

USPC .................................................. 310/71, 68 D
See application file for complete search history.

(56) References Cited

U.S. PATENT DOCUMENTS

| 8,299,667 | B2 * | 10/2012 | Isoda | ................... | H02K 11/046 |
| | | | | | 310/263 |
| 2006/0273671 | A1 * | 12/2006 | Oohashi | ............... | H02K 11/046 |
| | | | | | 310/68 D |
| 2010/0308700 | A1 * | 12/2010 | Isoda | ..................... | H02K 5/225 |
| | | | | | 310/68 D |

FOREIGN PATENT DOCUMENTS

JP        2008-295116 A      12/2008

* cited by examiner

*Primary Examiner* — Hanh Nguyen
(74) *Attorney, Agent, or Firm* — Sughrue Mion, PLLC

(57) ABSTRACT

A metal plate is insert-molded into a case so as to be exposed inside a B terminal mounting aperture so as to overlap with a busbar, a B terminal bolt is press-fitted from an opposite side from the busbar into a press-fitting aperture that is formed on the portion of the metal plate that is exposed inside the B terminal mounting aperture, a spacer and a nut are mounted onto a shaft portion of the B terminal bolt, and the nut is electrically connected to the busbar by the busbar being pressed and held between the spacer and the nut by a fastening force from the nut.

6 Claims, 6 Drawing Sheets

ROTARY ELECTRIC MACHINE

BACKGROUND OF THE INVENTION

1. Field of the Invention

The present invention relates to a rotary electric machine, and particularly relates to a construction of an electric power input and output terminal portion (a B terminal portion).

2. Description of the Related Art

In conventional rotary electric machines, a B busbar that is electrically connected to a positive electrode of an external battery includes three vertex portions that correspond to vertices of a triangle, is electrically connected to a B terminal by a fastening force from a screw at a single vertex portion, is mechanically fixed to and supported by a housing and a heatsink at the three vertex portions by fastening forces from screws so as to have insulating members interposed, and a B terminal bolt is press-fitted into a penetrating aperture that is disposed on a central portion of the B busbar (see Patent Literature 1, for example).

CITATION LIST

Patent Literature

[Patent Literature 1]
International Publication No. WO 2012/081068 (Pamphlet)

In conventional rotary electric machines, a nut that is mounted onto a B terminal bolt and a B busbar are connected electrically by a fastening force from the nut, and the B busbar and a B terminal are connected electrically by fastening forces from screws. Thus, because there are two fastening positions in the electric power transmission pathway, and the number of parts is increased, one problem has been that cost reductions cannot be achieved.

Because there are two fastening positions in the electric power transmission pathway, another problem has been that electrical contacting portions using pressure contact are increased, increasing electrical resistance, and reducing electric power transmitting efficiency.

SUMMARY OF THE INVENTION

The present invention aims to solve the above problems and an object of the present invention is to provide a rotary electric machine that simplifies construction of a B terminal portion by enabling a nut that is mounted onto a B terminal bolt and a busbar to be connected electrically fastening force from the nut, to reduce the number of parts, enabling cost reductions, and also to reduce electrical contacting portions using pressure contact, reducing electrical resistance, and improving electric power transmitting efficiency.

In order to achieve the above object, according to one aspect of the present invention, there is provided a rotary electric machine including: a front bracket and a rear bracket; a rotor that includes: a field core; and a field winding that is mounted onto the field core, the rotor being rotatably disposed by fixing the field core onto a rotating shaft that is rotatably supported by the front bracket and the rear bracket; a stator that includes: an annular stator core that is held between the front bracket and the rear bracket from two axial ends so as to be disposed so as to surround the rotor; and a stator winding that is mounted onto the stator core; an inverter assembly that includes: a plurality of power modules that perform power conversion between direct-current power and alternating-current power; a heatsink that is formed so as to have a flat shape that has a central aperture, that is disposed so as to be perpendicular to the rotating shaft such that a first surface faces axially outward and such that the rotating shaft passes through the central aperture, the plurality of power modules being mounted onto the first surface so as to line up circumferentially; an insulating resin case that is fixed to the first surface of the heatsink; and a busbar that is insert-molded into the case so as to be exposed inside a B terminal mounting aperture that is formed on the case so as to be electrically connected to positive electrode input terminals of the plurality of power modules; and a B terminal bolt that is electrically connected to the busbar. A metal plate is insert-molded into the case so as to be exposed inside the B terminal mounting aperture so as to overlap with the busbar, the B terminal bolt is press-fitted from an opposite side from the busbar into a press-fitting aperture that is formed on the portion of the metal plate that is exposed inside the B terminal mounting aperture, a nut is mounted onto a shaft portion of the B terminal bolt, and the nut is electrically connected to the busbar by the busbar being pressed and held between the metal plate and the nut by a fastening force from the nut.

According to the present invention, because a busbar and a nut are electrically connected by a single fastening mechanism using a B terminal bolt and the nut, construction of a B terminal portion is simplified, and the number of parts is reduced, enabling cost reductions to be achieved. In addition, because electrical contacting portions using pressure contact in an electric power transmission pathway are reduced, electrical resistance is reduced, enabling generated heat to be suppressed, and improving electric power transmitting efficiency.

DETAILED DESCRIPTION OF THE PREFERRED EMBODIMENTS

Embodiment 1

Figure 1:
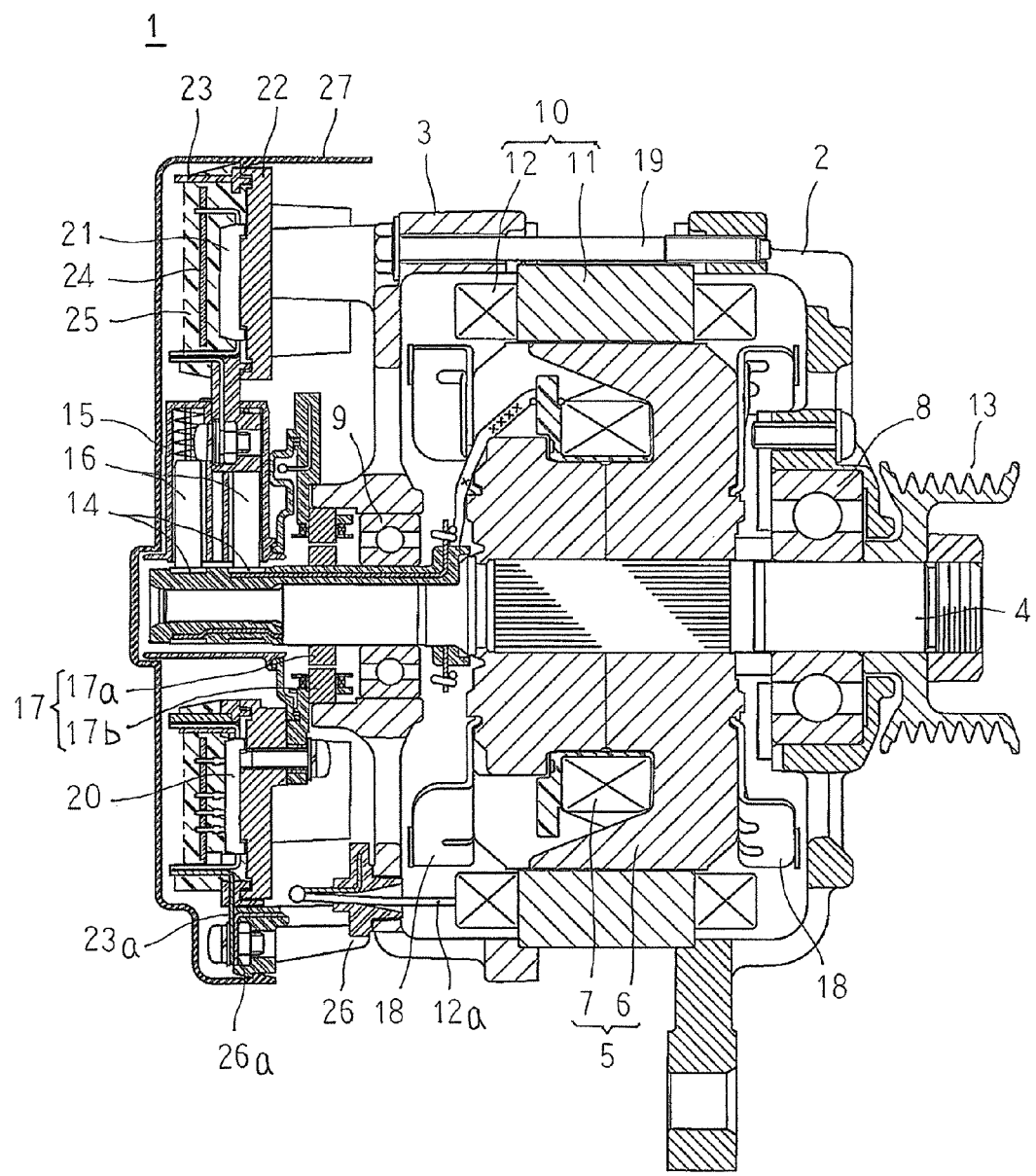
FIG. 1 is a longitudinal cross section that shows a rotary electric machine according to Embodiment 1 of the present invention.
Figure 2:
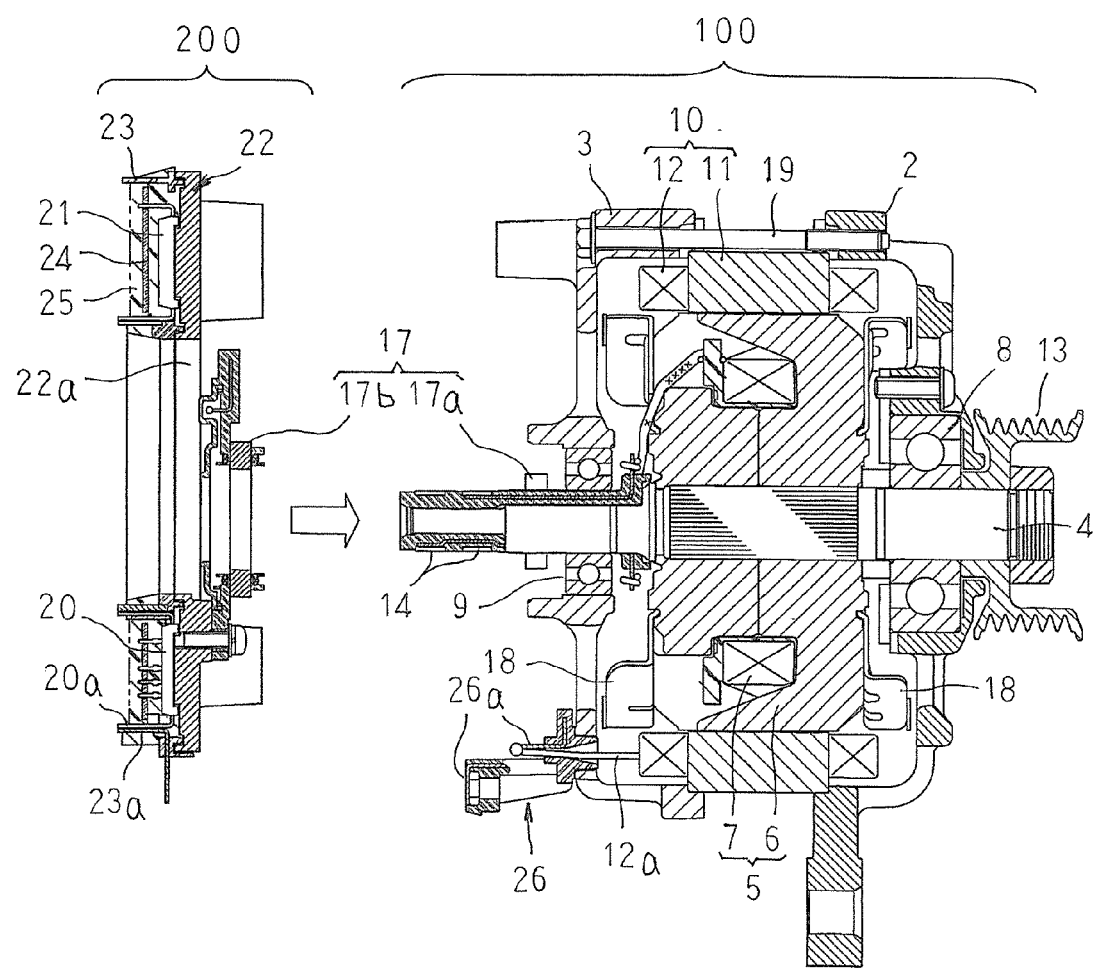
FIG. 2 is a longitudinal cross section that shows a state before an inverter assembly is mounted in the rotary electric machine according to Embodiment 1 of the present invention.
Figure 3:
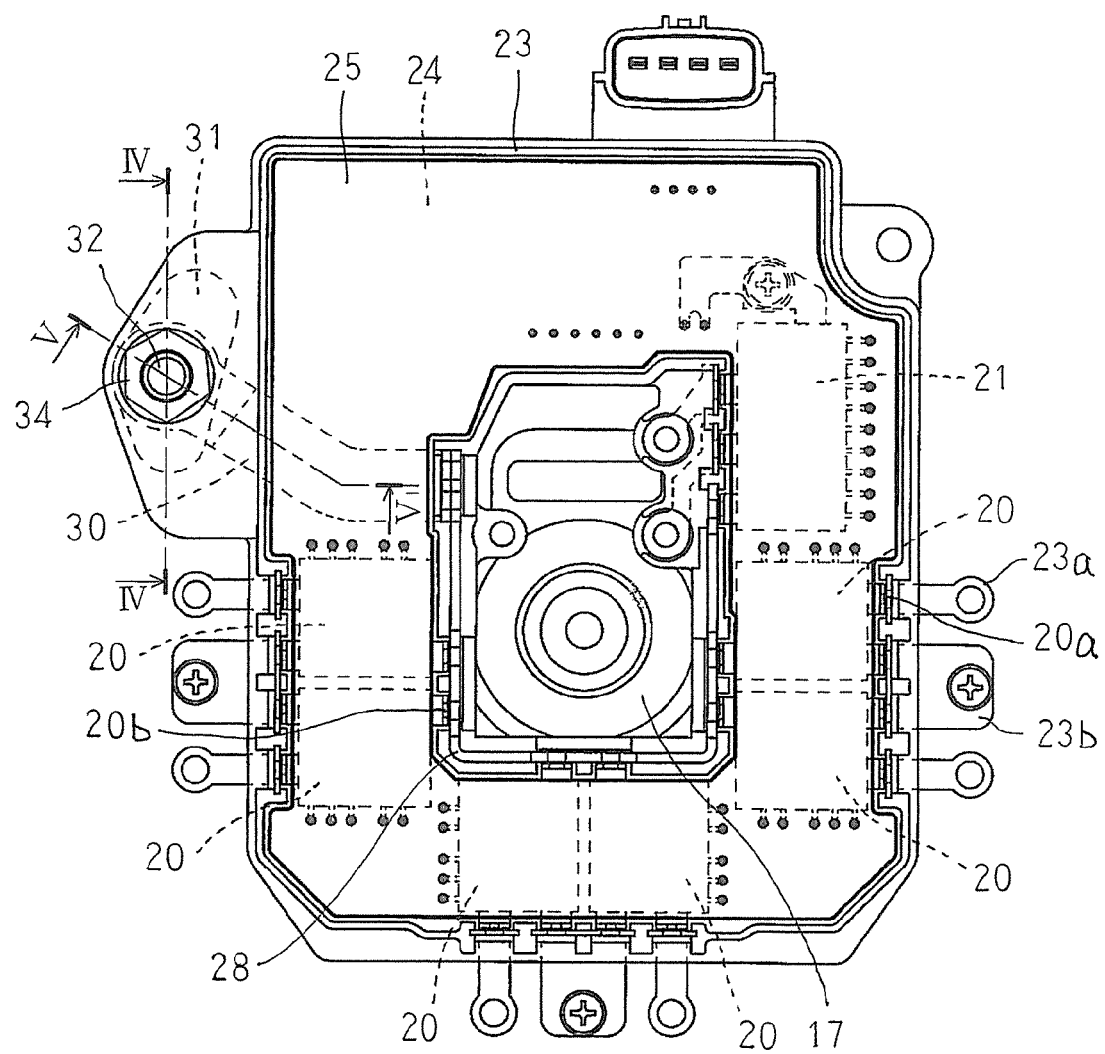
FIG. 3 is a front elevation that shows the inverter assembly in the rotary electric machine according to Embodiment 1 of the present invention.
Figure 4:
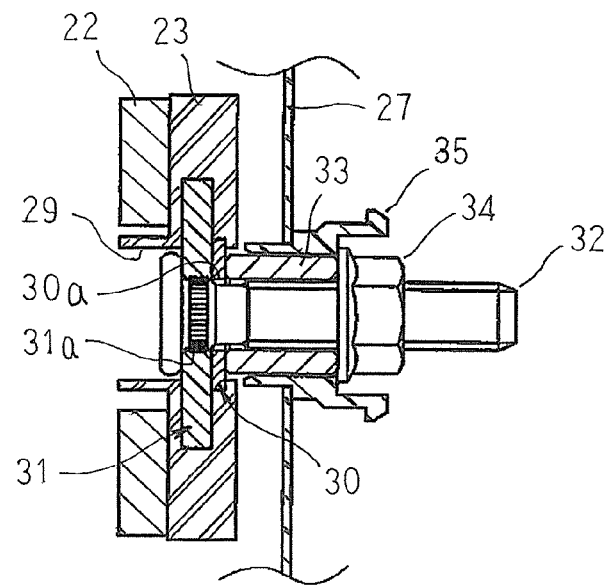
FIG. 4 is a cross section that is taken along Line IV-IV in FIG. 3 so as to be viewed in the direction of the arrows.
Figure 5:
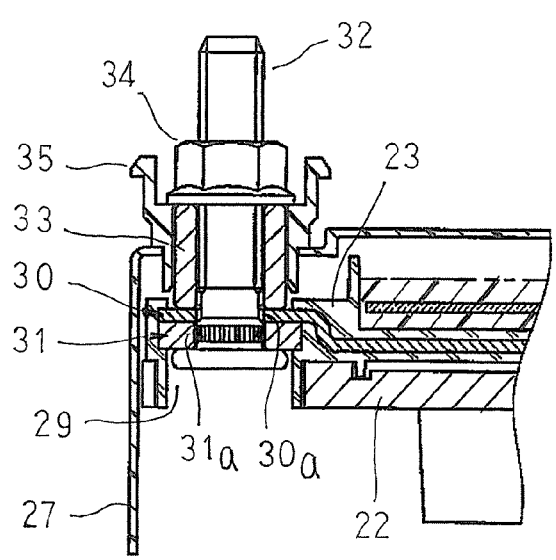
FIG. 5 is a cross section that is taken along Line V-V in FIG. 3 so as to be viewed in the direction of the arrows.

FIG. 1 is a longitudinal cross section that shows a rotary electric machine according to Embodiment 1 of the present invention, FIG. 2 is a longitudinal cross section that shows a state before an inverter assembly is mounted in the rotary electric machine according to Embodiment 1 of the present invention, FIG. 3 is a front elevation that shows the inverter assembly in the rotary electric machine according to Embodiment 1 of the present invention, FIG. 4 is a cross section that is taken along Line IV-IV in FIG. 3 so as to be viewed in the direction of the arrows, and FIG. 5 is a cross section that is taken along Line V-V in FIG. 3 so as to be viewed in the direction of the arrows.

In FIGS. 1 through 3, a rotary electric machine 1 includes a motor portion 100, and an inverter assembly 200.

The motor portion 100 includes: a front bracket 2 and a rear bracket 3 that are each approximately bowl-shaped and made of metal; a rotor 5 that is fixed to a rotating shaft 4 that is rotatably supported by the front bracket 2 and the rear bracket 3 by means of first and second bearings 8 and 9 so as to be disposed inside the front bracket 2 and the rear bracket 3; a stator 10 that is held by the front bracket 2 and the rear bracket 3 so as to surround the rotor 5; a pulley 13 for delivering torque bidirectionally to and from an internal combustion engine (not shown) that is fixed to an end portion of the rotating shaft 4 that protrudes out of the front bracket 2; a pair of slip rings 14 that are disposed on an outer circumferential surface of an end portion of the rotating shaft 4 that protrudes out of the rear bracket 3, and that supply a field current to a field winding 7 of the rotor 5; a pair of brushes 16 that are held by a brush holder 15, and that are disposed so as to slide on the pair of slip rings 14; and a magnetic pole position detecting sensor 17 that is disposed between the second bearing 9 and the slip rings 14 so as to be coaxial to the rotating shaft 4 so as to detect magnetic pole positions of the rotating shaft 4, i.e., the rotor 5.

The rotor 5 includes: a field core 6; and a field winding 7 that is disposed inside the field core 6, the rotor being fixed to the rotating shaft 4, which is inserted at the central axial position of the field core 6, so as to be rotatably disposed inside the front bracket 2 and the rear bracket 3. Fans 18 are fixed to two axial end surfaces of the field core 6.

The stator 10 includes: an annular stator core 11; and a stator winding 12 that is mounted onto the stator core 11. The front bracket 2 and the rear bracket 3 are fastened by a plurality of bolts 19 so as to be in close proximity to each other, and clamp the stator core 11 firmly from two axial ends. The stator 10 is thereby disposed coaxially so as to surround the rotor 5.

The magnetic pole position detecting sensor 17 includes: a sensor rotor 17a that is fixed to the rotating shaft 4 between the second bearing 9 and the slip rings 14; and a sensor stator 17b that is disposed so as to surround the sensor rotor 17a.

The inverter assembly 200 includes: six power modules 20 that are constituted by switching elements and peripheral circuits thereof, for performing supply of stator electric current during driving and rectification of the stator electric current during electric power generation; a field module 21 that is constituted by switching elements and peripheral circuits thereof for controlling the field current; a heatsink 22 that is produced into an annular flat plate that has a central aperture 22a using a good electrically conductive metal material such as copper, aluminum, etc., and on a first surface of which the power modules 20 and the field module 21 are mounted so as to line up in a single row circumferentially so as to have an insulating layer (not shown) interposed; an electrically insulating resin case 23 into which terminals are insert-molded that are connected to electric power system terminals of the power modules 20 and the field module 21; and a controlling module 24 on which a controlling circuit for controlling the power modules 20 and the field module 21 is configured. The sensor stator 17b of the magnetic pole position detecting sensor 17 is mounted onto the heatsink 22, and a signal wire of the magnetic pole position detecting sensor 17 is connected to the controlling module 24.

The power modules 20 and the field module 21 are each produced by mounting switching elements, etc., onto a wiring lead frame, and molding them collectively in resin. The case 23 is mounted onto the first surface of the heatsink 22 so as to surround the power modules 20, the field module 21, and the controlling module 24. First ends of terminals 23a that are insert-molded into the case 23 are joined by welding onto alternating-current output terminals 20a of the power modules 20, and a negative terminal 23b of the inverter assembly 200 is electrically connected to the heatsink 22 by fastening a screw. The power modules 20, the field module 21, the controlling module 24, and the electrical connecting portions are waterproofed by filling the case 23 with a waterproofing resin 25.

A connecting board 26 is configured by insert-molding terminals 26a for connecting output wires 12a of the stator winding 12 and the power modules 20, and is fixed axially outside the rear bracket 3 by a screw. The output wires 12a are led axially outside through the rear bracket 3, and are joined to the first ends of the terminals 26a by welding, etc.

The brush holder 15 is disposed inside the central aperture 22a through which the rotating shaft 4 of the heatsink 22 passes, and is fixed to the heatsink 22 by a screw. The inverter assembly 200 is mounted axially outside the rear bracket 3 such that the first surface of the heatsink 22 faces axially outward, the rotating shaft 4 is passed through the central aperture 22a, and the first surface of the heatsink 22 is perpendicular to the rotating shaft 4. Then, second ends of the terminals 26a that are insert-molded into the connecting board 26 are fixed and electrically connected by screws to second ends of the terminals 23a that are insert-molded into the case 23. Thereafter, a protective cover 27 is mounted so as to house the inverter assembly 200 internally.

Next, construction of a B terminal portion will be explained with reference to FIGS. 3, 4, and 5.

A busbar 30 that is connected to a positive-electrode side of an external battery is insert-molded into the case 23 such that a first end thereof is exposed inside a B terminal mounting aperture 29 that is formed on an outer circumferential side of the case 23, the busbar extends radially inward through the case 23 on a side near the heatsink 22 and protrudes into the central aperture 22a, and a second end thereof is joined by welding onto a conductor wiring 28. The conductor wiring 28 is also joined by welding onto the positive electrode input terminals 20b of the power modules 20. The busbar 30 is thereby electrically connected by means of the conductor wiring 28. A metal plate 31 is insert-molded into the case 23, and is exposed so as to overlap with the busbar 30 inside the B terminal mounting aperture 29. A press-fitting aperture 31a for press-fitting a B terminal bolt 32 is formed on a portion of the metal plate 31 that is exposed inside the B terminal mounting aperture 29. In addition, a penetrating aperture 30a that has a larger diameter than a shaft portion of the B terminal bolt 32 is formed so as to be coaxial to the press-fitting aperture 31a on a portion of the busbar 30 that is exposed inside the B terminal mounting aperture 29.

The B terminal bolt 32 is press-fitted into the press-fitting aperture 31a from an opposite side of the metal plate 31 from the busbar 30. A tubular metal spacer 33 is mounted onto the shaft portion of the B terminal bolt 32 that protrudes out of the penetrating aperture 30a of the busbar 30, and a nut 34 that constitutes a harness connecting pedestal is then mounted onto the shaft portion of the B terminal bolt 32, and is fastened. The busbar 30 is held under pressure between the metal plate 31 and the spacer 33 by the fastening force from this nut 34. Thus, the busbar 30 and the spacer 33 are placed in pressure contact, the spacer 33 and the nut 34 are placed in pressure contact, and the nut 34 is electrically connected to the busbar 30 by means of the spacer 33. An insulating bush 35 is mounted so as to be fitted over the spacer 33 such that the spacer 33 and the nut 34 are insulated and protected.

Moreover, although not shown, a battery harness is mounted onto a portion of the shaft portion of the B terminal bolt 32 that protrudes from the nut 34 such that the busbar 30 is electrically connected to a positive electrode of the battery by means of the battery harness.

Next, operation of a rotary electric machine 1 that is configured in this manner will be explained.

The rotary electric machine 1 is linked to a crank shaft (not shown) of an engine by means of the pulley 13 and a belt (not shown). The positive electrode of the battery is connected to the B terminal bolt 32. The front bracket 2 and the rear bracket 3 are grounded so as to be kept at ground electric potential. The controlling module 24 controls the field module 21 so as to adjust the field current that is passed to the field winding 7 of the rotor 5. The rotary electric machine 1 has: an electric motor function for starting the engine; and a power generating function for generating power.

Here, during starting of the engine, direct-current power is supplied from the battery through the nut 34, the spacer 33, and the busbar 30 to the power modules 20. The controlling module 24 performs on-off control of the switching elements of the power modules 20 to convert the direct-current power into three-phase alternating-current power. This three-phase alternating-current power is supplied to the stator winding 12 by means of the alternating-current output terminals 20a, the terminals 23a and 26a, and the output wires 12a. Thus, a rotating magnetic field is applied to the field winding 9 of the rotor 5 to which a field current is being supplied by the field module 21, driving the rotor 5 to rotate. Rotational torque from the rotor 5 is transmitted to the engine by means of the rotating shaft 4, the pulley 13, and the belt so as to ignite and start the engine.

Then, once the engine has been started, rotational torque from the engine is transmitted to the rotary electric machine 1 by means of a crank pulley, the belt, and the pulley 13. Thus, the rotor 5 is rotated, inducing a three-phase alternating-current voltage in the stator winding 12. Then, the controlling module 24 performs on-off control of the switching elements of the power modules 20 such that the three-phase alternating-current power that has been induced in the stator winding 12 is converted into direct-current power, and is supplied to the battery, and electric loads, etc.

Moreover, signal output from the magnetic pole position detecting sensor 17 is sent to the controlling module 24 and is used for rotational position detection of the rotor 5, and is used as control information during the power generating operation and the engine starting operation of the rotary electric machine 1.

According to Embodiment 1, a nut 34 that constitutes a harness connecting pedestal and a busbar 30 are electrically connected by fastening a B terminal bolt 32 and a nut 34, that is, by a single fastening mechanism. Thus, because construction of the B terminal portion is simplified, and the number of parts is reduced, cost reductions can be achieved. Because the portion of the electric power transmission pathway that is electrically connected by pressure contact is reduced, electrical resistance is reduced, enabling generated heat to be suppressed, and improving electric power transmitting efficiency.

Because a spacer 33 is disposed between the busbar 30 and the nut 34, a region of the shaft portion of the B terminal bolt 32 that is inside the spacer 33 constitutes a portion on which a thread is not fastened. Thus, when the nut 34 is fastened, an elastic force arises in the portion in question of the shaft portion of the B terminal bolt 32, preventing loosening of the nut 34.

Because a B terminal mounting aperture 29 is formed on an outer circumferential side of an inverter assembly 200, and the busbar 30 extends radially inward through the case 23 on a side near the heatsink 22, protrudes into the central aperture 22a, and is electrically connected to the positive electrode input terminals 20b, the length of the electric power transmission pathway is minimized, enabling inductance to be reduced. Because heat generated in the busbar 30 is transferred to the heatsink 22 effectively and is radiated from the heatsink 22, temperature increases in the busbar 30 are suppressed.

Here, if an aluminum plate is used as the metal plate 31, stable press-fitting of the B terminal bolt 32 is enabled because irregularities in press-fitting load can be reduced even if dimensional irregularities in the press-fitting interference are large, enabling productivity to be improved.

Embodiment 2

Figure 6:
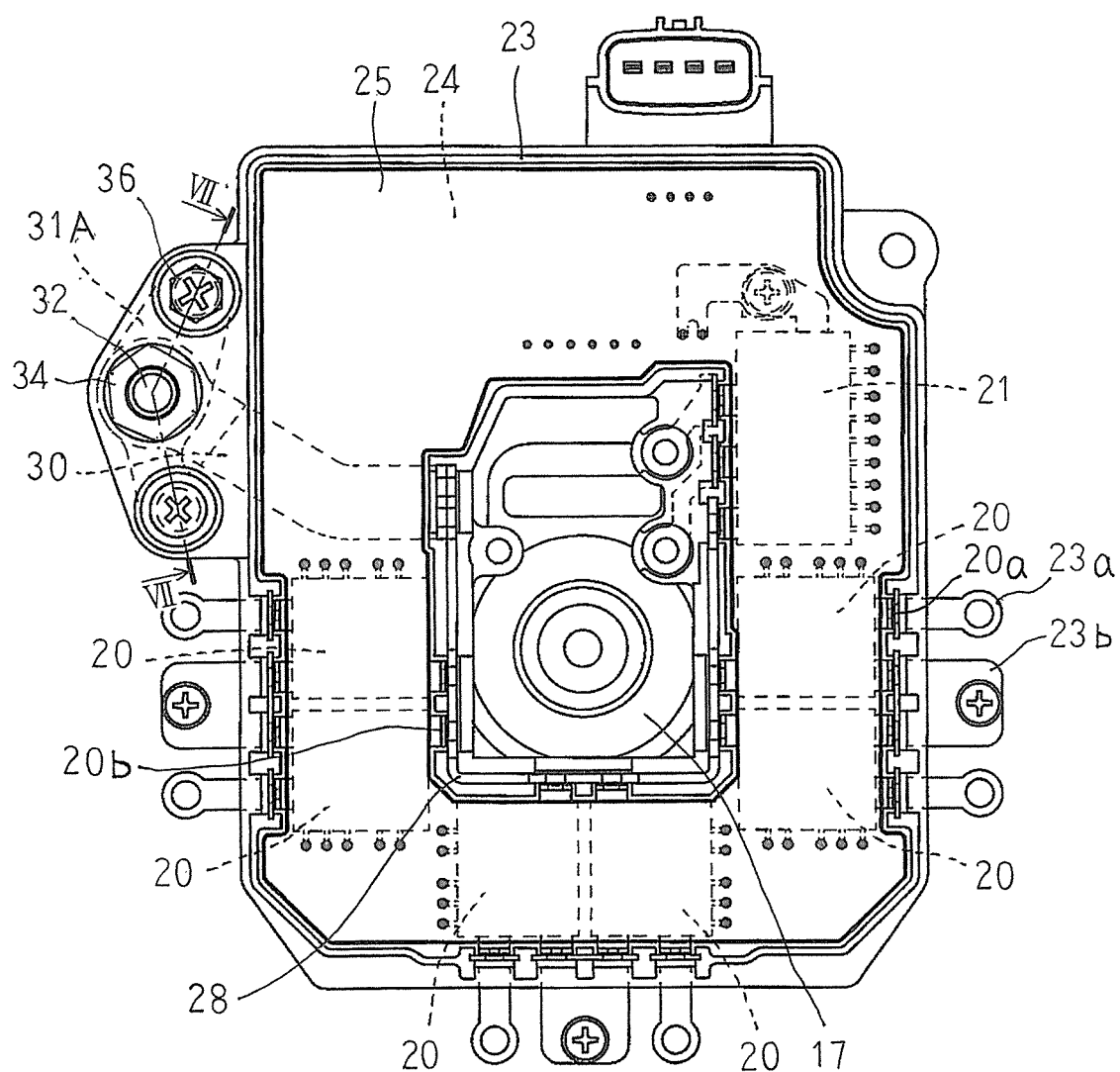
FIG. 6 is a front elevation that shows an inverter assembly in a rotary electric machine according to Embodiment 2 of the present invention.
Figure 7:
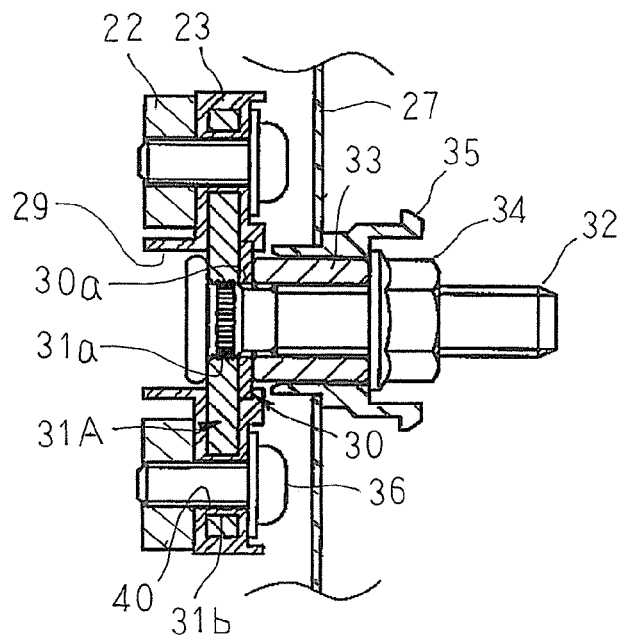
FIG. 7 is a cross section that is taken along Line VII-VII in FIG. 6 so as to be viewed in the direction of the arrows.

FIG. 6 is a front elevation that shows an inverter assembly in a rotary electric machine according to Embodiment 2 of the present invention, and FIG. 7 is a cross section that is taken along Line VII-VII in FIG. 6 so as to be viewed in the direction of the arrows.

In FIGS. 6 and 7, a metal plate 31A includes: a press-fitting aperture 31a; and a pair of mounting apertures 31b that are formed on opposite sides of the press-fitting aperture 31a, and the press-fitting aperture 31a is insert-molded into a case 23 so as to be exposed inside a B terminal mounting aperture 29. Penetrating apertures 40 are formed on the case 23 so as to pass through the mounting apertures 31b so as to leave an insulating resin layer. The metal plate 31A is fixed to a heatsink 22 in an electrically insulated state by passing screws through the penetrating apertures 40 and fastening them into the heatsink 22.

Moreover, the rest of the configuration is formed in a similar or identical manner to that of Embodiment 1 above.

According to Embodiment 2, because the metal plate 31A is fixed mechanically to the heatsink 22 at a location that is different than that of the B terminal portion, an insulating resin is not interposed on the B terminal portion. Thus, increases in electrical resistance in the electric power transmission pathway that result from reductions in bolt shaft tension due to heat deformation of the insulating resin can be prevented.

Embodiment 3

Figure 8:
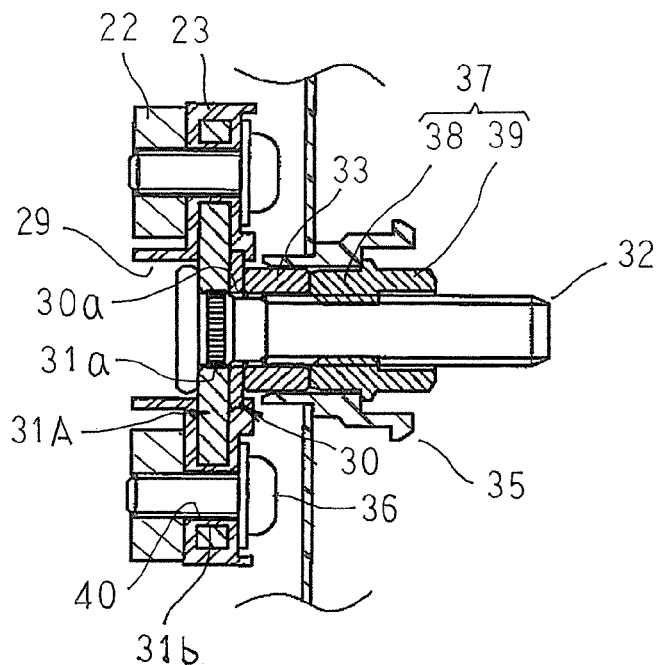
FIG. 8 is a partial cross section that shows a vicinity of a B terminal portion of an inverter assembly in a rotary electric machine according to Embodiment 3 of the present invention.

FIG. 8 is a partial cross section that shows a vicinity of a B terminal portion of an inverter assembly in a rotary electric machine according to Embodiment 3 of the present invention.

In FIG. 8, a nut 37 that constitutes a harness connecting pedestal includes: a nut portion 38 that has an internal screw thread portion that is mounted onto a shaft portion of a B terminal bolt 32; and a threadless cylindrical portion 39 that is formed integrally on the nut portion 38 so as to extend coaxially, and that has an inside diameter that is larger than the diameter of the shaft portion of the B terminal bolt 32.

The B terminal bolt 32 is press-fitted into a press-fitting aperture 31*a* from an opposite side of a metal plate 31A from a busbar 30, a spacer 33 is mounted onto the shaft portion of the B terminal bolt 32 that protrudes out of the penetrating aperture 30*a* of the busbar 30, and the nut 37 is then mounted onto the shaft portion of the B terminal bolt 32 such that the nut portion 38 faces toward the spacer 33, and is fastened. The busbar 30 is held under pressure between the metal plate 31A and the spacer 33 by the fastening force from this nut 37, and the nut 37 is electrically connected to the busbar 30 by means of the spacer 33.

Moreover, the rest of the configuration is formed in a similar or identical manner to that of Embodiment 2 above.

According to Embodiment 3, the cylindrical portion 39 that has an inside diameter that is larger than an outside diameter of the shaft portion of the B terminal bolt 32 is formed on a side of the nut 37 to which a battery harness is mounted. Thus, when a battery harness fastening nut is mounted onto the shaft portion of the B terminal bolt 32 and fastened, an elastic force arises in a portion of the shaft portion of the B terminal bolt 32 that is inside the cylindrical portion 39, preventing loosening of the nut 37 and the battery harness fastening nut.

What is claimed is:

1. A rotary electric machine comprising:
    a front bracket and a rear bracket;
    a rotor that includes:
        a field core; and
        a field winding that is mounted onto said field core,
        said rotor being rotatably disposed by fixing said field core onto a rotating shaft that is rotatably supported by said front bracket and said rear bracket;
    a stator that includes:
        an annular stator core that is held between said front bracket and said rear bracket from two axial ends so as to be disposed so as to surround said rotor; and
        a stator winding that is mounted onto said stator core;
    an inverter assembly that includes:
        a plurality of power modules that perform power conversion between direct-current power and alternating-current power;
        a heatsink that is formed so as to have a flat shape that has a central aperture, and that is disposed so as to be perpendicular to said rotating shaft such that a first surface of said heatsink faces axially outward and such that said rotating shaft passes through said central aperture, said plurality of power modules being mounted onto said first surface of said heatsink so as to line up circumferentially;
        an insulating resin case that is fixed to said first surface of said heatsink; and
        a busbar that is insert-molded into said case so as to be exposed inside a B terminal mounting aperture that is formed on said case so as to be electrically connected to positive electrode input terminals of said plurality of power modules; and
        a B terminal bolt that is electrically connected to said busbar,
    wherein:
        a metal plate is insert-molded into said case so as to be exposed inside said B terminal mounting aperture so as to overlap with said busbar;
        said B terminal bolt is press-fitted from an opposite side from said busbar into a press-fitting aperture that is formed on said portion of said metal plate that is exposed inside said B terminal mounting aperture;
        a nut is mounted onto a shaft portion of said B terminal bolt; and
        said nut is electrically connected to said busbar by said busbar being pressed and held between said metal plate and said nut by a fastening force from said nut.

2. The rotary electric machine according to claim 1, wherein:
    a pair of mounting apertures are formed on said metal plate so as to be positioned on opposite sides of said press-fitting aperture;
    said metal plate is insert-molded into said case such that said pair of mounting apertures are embedded;
    penetrating apertures are formed on said case so as to pass through said pair of mounting apertures; and
    said metal plate is fixed to said heatsink in an electrically insulated state by fastening screws that are passed through said penetrating apertures to said heatsink.

3. The rotary electric machine according to claim 1, wherein:
    a tubular metal spacer is disposed between said busbar and said nut.

4. The rotary electric machine according to claim 1, wherein a cylindrical portion that has an inside diameter that is larger than a diameter of said shaft portion of said B terminal bolt is formed integrally on said nut on an opposite side of said nut from said busbar, and is disposed so as to be fitted over said shaft portion of said B terminal bolt.

5. The rotary electric machine according to claim 1, wherein said metal plate is made of aluminum.

6. The rotary electric machine according to claim 1, wherein:
    said B terminal mounting aperture is formed on an outer circumferential side of said inverter assembly; and
    said busbar extends radially inward through said case on a side near said heatsink, and protrudes into said central aperture to be electrically connected to said positive electrode input terminals.

* * * * *